United States Patent [19]

Shono

[11] Patent Number: 6,038,409
[45] Date of Patent: Mar. 14, 2000

[54] VIEWFINDER OPTICAL SYSTEM OF THIN-TYPE CAMERA

[75] Inventor: Tetsuji Shono, Tokyo, Japan

[73] Assignee: Asahi Kogaku Kogyo Kabushiki Kaisha, Tokyo, Japan

[21] Appl. No.: 09/085,018

[22] Filed: May 28, 1998

[30] Foreign Application Priority Data

May 29, 1997 [JP] Japan .................................. 9-139507

[51] Int. Cl.[7] ........................... G03B 13/02; G03B 13/08
[52] U.S. Cl. ...................... 396/373; 396/379; 396/385; 396/386
[58] Field of Search ................................. 396/351, 352, 396/373, 378, 379, 384, 385, 386

[56] References Cited

U.S. PATENT DOCUMENTS

| | | | |
|---|---|---|---|
| 4,032,938 | 6/1977 | Karikawa et al. | 396/354 |
| 4,037,238 | 7/1977 | Leitz et al. | 396/351 |
| 5,119,122 | 6/1992 | Kudo et al. | 396/379 |
| 5,182,592 | 1/1993 | Betensky et al. | 396/379 |
| 5,216,457 | 6/1993 | Yamaguchi et al. | 396/377 |
| 5,235,460 | 8/1993 | Abe | 396/384 |
| 5,621,568 | 4/1997 | Hasushita et al. | 359/432 |
| 5,687,413 | 11/1997 | Kawamura | 396/351 |
| 5,694,628 | 12/1997 | Nishitani | 396/379 |
| 5,701,534 | 12/1997 | Taguchi et al. | 396/373 |

OTHER PUBLICATIONS

Japanese Publication entitled "Encyclopedia Of Camera" published Dec. 15, 1977, p. 70, describing a "Porro–Mirror Viewfinder System", along with an English language translation.

*Primary Examiner*—Eddie C. Lee
*Attorney, Agent, or Firm*—Greenblum & Bernstein, P.L.C.

[57] ABSTRACT

In a viewfinder optical system in a thin-type camera, the following are provided: first to fourth lenses for effecting image-forming operation; a first reflecting mirror for bending a principal optical axis 90 degrees in a heightwise direction of a camera; a second reflecting mirror for bending thin bent optical axis 90 degrees in a widthwise direction of the camera; a third reflecting mirror for bending this bent optical axis 90 degrees in an opposite direction to the heightwise direction of the camera; and a fourth reflecting mirror for bending this bent optical axis 90 degrees in a direction parallel with the principal optical axis. Despite the fact that the camera is made thin, its optical path length can be made long, and it is possible to form a viewfinder optical system having a high magnification of the viewfinder or a viewfinder optical system having a zooming structure.

9 Claims, 5 Drawing Sheets

VIEWFINDER OPTICAL SYSTEM OF THIN-TYPE CAMERA

BACKGROUND OF THE INVENTION

The present invention relates to the structure of a viewfinder of a thin-type camera whose transverse dimension, i.e., depth, is small, and more particularly to a viewfinder optical system which permits high magnification and zooming.

In recent years, various types of so-called digital camera have been proposed which effect recording and reproduction by photographing with a CCD element a subject image formed by a taking optical system. With this type of camera, since the imaging area of the CCD element is small, the focal length of the taking optical system for obtaining a standard angle of view also becomes short. Hence, since the optic-axial distance of the taking optical system can be made short, the dimension in the direction of the principal optical axis of the taking optical system, i.e., the depth of the camera, can be made small, and it is possible to configure a camera which is thin in its transverse direction. However, in a case where a direct-view finder is fitted in this type of camera, an arrangement is provided such that an objective window is disposed on the front surface side of the camera, and an ocular window is disposed on the rear surface side of the camera. Consequently, the optic-axial length of the viewfinder optical system also becomes short in conjunction with the trend toward the thinner camera, and the magnification of the viewfinder becomes small, with the result that the subject image is confirmed and the photographing range is confirmed while viewing a small subject image, making it impossible to effect satisfactory viewfinder confirmation.

In addition, among the above-described digital cameras in recent years, one which uses a zoom lens as its taking optical system has been proposed, and as its viewfinder optical system one having a zooming configuration capable of varying the magnification of the viewfinder in correspondence with the zoom magnification in the taking optical system is installed. With such a digital camera having the zooming configuration, if an attempt is made to make the camera thin as described above, the optic-axial length of the viewfinder optical system becomes short, which makes it difficult to realize a viewfinder optical system having the zooming configuration capable of realizing a zoom magnification and a zoom ratio which are desired.

Thus, with the conventional thin-type cameras, since a restriction is imposed on the optic-axial length of the viewfinder optical system, there are problems in that it is impossible to obtain a viewfinder optical system of a high magnification and a viewfinder optical system of a desired zoom magnification, and that, in particular, it is difficult to confirm the subject with a high magnification during shooting.

SUMMARY OF THE INVENTION

An object of the present invention is to provide a viewfinder optical system in a thin-type camera which is capable of realizing a high magnification and a zoom magnification and a zoom ratio which are desired.

In a thin-type camera whose dimension in the direction of the principal optical axis is small, the viewfinder optical system in accordance with the present invention comprises:

a reflecting mechanism which bends its principal optical axis in at least one of a widthwise direction and a heightwise direction of the camera; and a reflecting mechanism which bends the bent optical axis in a direction parallel with the principal optical axis.

For example, the reflecting mechanism, which bands the principal optical axis, is constituted by a first reflecting mirror for bending the principal optical axis 90 degrees in the heightwise direction of the camera, a second reflecting mirror for bending the optical axis, bent by the first reflecting mirror, 90 degrees in the widthwise direction of the camera, and a third reflecting mirror for bending the optical axis, bent by the second reflecting mirror, 90 degrees in an opposite direction to the heightwise direction of the camera, while the reflecting mechanism, which bends the bent optical axis in the direction parallel with the principal optical axis, is constituted by a fourth reflecting mirror for bending the optical axis, bent by the third reflecting mirror, 90 degrees in the direction parallel with the principal optical axis. Alternatively, the reflecting mechanism, which bends the principal optical axis, is constituted by a reflecting mirror for bending the principal optical axis 90 degrees with respect to the principal optical axis, while the reflecting mechanism for bending the bent optical axis in the direction parallel with the principal optical axis is constituted by a prism.

Since the viewfinder optical system is provided with the reflecting mechanism which bends its principal optical axis in at least one of a widthwise direction and a heightwise direction of the camera; and the reflecting mechanism which bends the bent optical axis in a direction parallel with the principal optical axis. Accordingly, the optical path of the viewfinder optical system can be bent in the widthwise direction or heightwise direction of the camera, and the optical path length can be made long despite the fact that the camera is made thin. As a result, it is possible to form a viewfinder optical system having a high magnification of the viewfinder or a viewfinder optical system having a zooming structure. Thus, it is possible to realize satisfactory photographing while viewing the subject in a highly magnified state although the camera is of the thin type. In addition, as the respective reflecting mechanisms are disposed at appropriate positions inside the camera, it is possible to prevent the bent optical axis from interfering with various components inside the camera. Hence, it also becomes possible to make effective use of the inner space of the camera and make the camera compact in size.

The present disclosure relates to the subject matter contained in Japanese patent application No. Hei. 9-139507 (filed on May 29, 1997) which is expressly incorporated herein by reference in its entirety.

DETAILED DESCRIPTION OF THE PREFERRED EMBODIMENTS

Figure 1A:
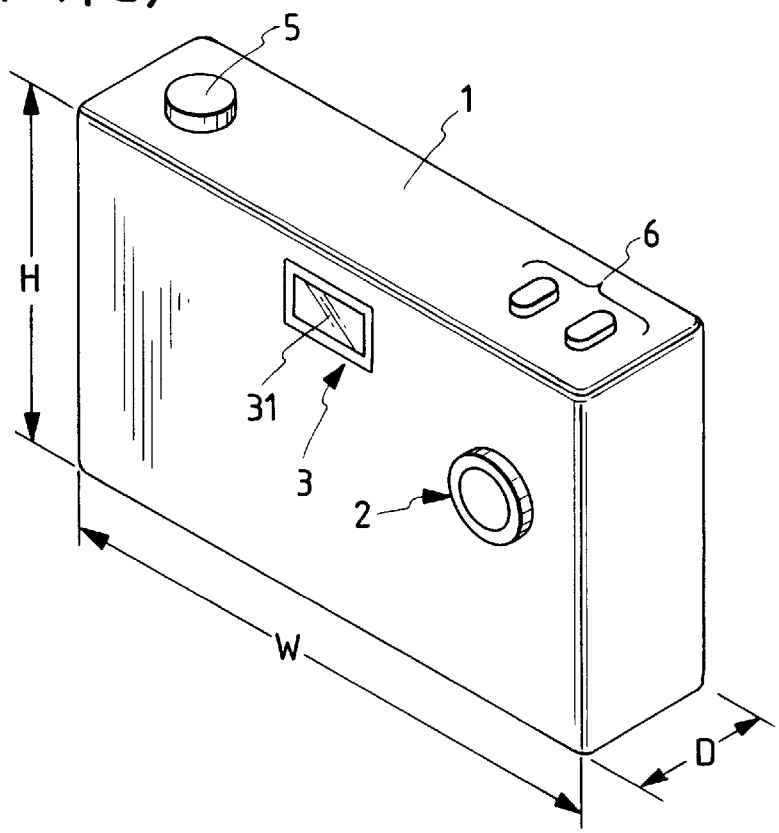
FIGS. 1(a) and 1(b) are schematic perspective views of the front side and the rear side, respectively, of an embodiment of a thin-type camera provided with a viewfinder optical system.
Figure 1B:
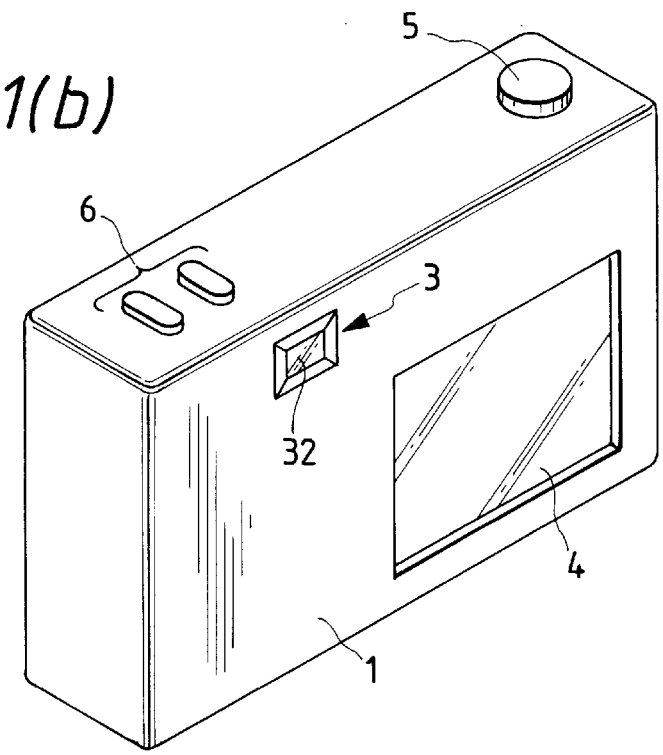

FIGS. 1(a) and 1(b) are perspective views of an embodiment in which the present invention is applied to a thin-type digital camera having a zooming configuration, in which FIG. 1(a) is a view of the front side, while FIG. 1(b) is a view of the rear side. A camera body 1 is formed in the shape of a thin-type rectangular casing whose depth D is made small in comparison with its width W and height H. On its front surface, a taking optical system 2 is disposed at an upper right position as one faces the front surface, and an objective window 31 of a viewfinder optical system 3 is disposed at a position adjacent to the taking optical system 2. In addition, on the rear surface of the camera body 1, an ocular window 32 of the viewfinder optical system 3 is disposed at a position on the upper left-hand side as one views the rear surface, and a liquid-crystal display (LCD) 4 for monitoring a photographed image is disposed in a lower region on the right-hand side. Further, a release button 5 and other switches 6 are arranged on the upper surface of the camera body 1.

Figure 2:
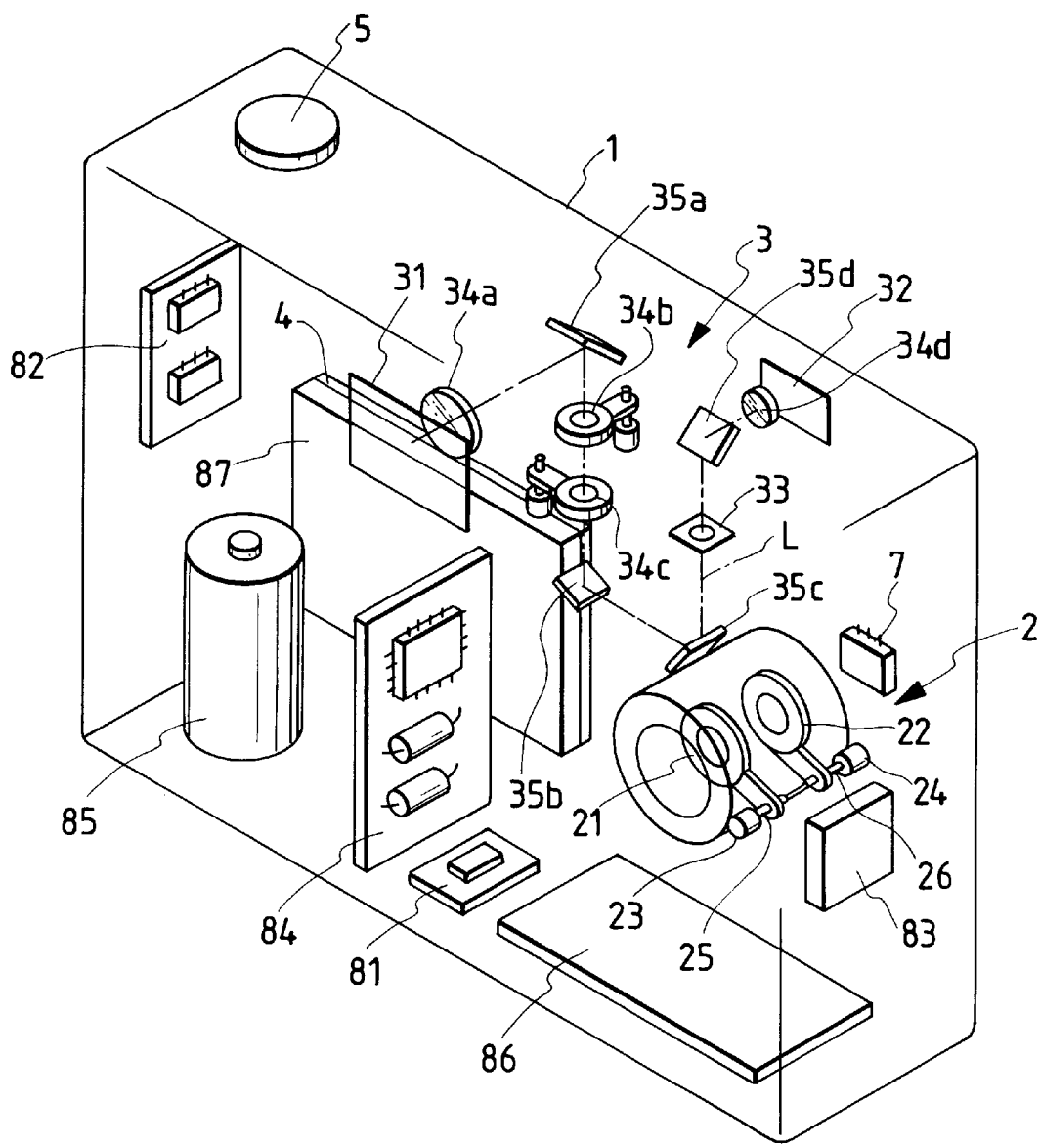
FIG. 2 is a schematic perspective view illustrating the overall arrangement of the thin-type camera in accordance with a first embodiment.

FIG. 2 is a schematic perspective view illustrating the arrangement of various parts in the camera body 1 of the above-described digital camera. The taking optical system 2 is configured as a zoom lens, and, of a plurality of lenses constituting the taking optical system 2, lenses 21 and 22 are respectively moved in the direction of the principal optical axis by feeding mechanisms 25 and 26 using miniature motors 23 and 24 as their driving sources, the focal length, i.e., the zoom magnification, being arranged to be changeable and adjustable. In addition, a CCD 7 is disposed at an image-forming position of this taking optical system 2 to photograph a subject image formed by the taking optical system 2 and output the same as an image signal. It should be noted that since the configuration and the operating principle of the CCD 7 is an already-known technology, a detailed description will be omitted here.

Meanwhile, the viewfinder optical system 3 also adopts a zooming configuration in which the magnification of the viewfinder is changeable. As its details will be described later, an optical path L leading from the objective window 31 to the ocular window 32 is bent, and four lenses 34a to 34d, four reflecting mirrors 35a to 35d, and a field-of-view mask 33 are arranged along this optical path L. In the interior region of the camera body 1 which does not interfere with the optical path L of this viewfinder optical system 3, the following are installed: a circuit board 81 on which a processing circuit for processing the image signal outputted from the CCD 7 is mounted; a circuit board 82 on which a drive circuit for driving the LCD 4 is mounted; a circuit board 83 on which a drive circuit for driving the miniature motors 23 and 24 of the taking optical system 2 is mounted; a circuit board 84 on which a central processing circuit for controlling the aforementioned various circuits in an integrating manner is mounted; a battery 85; a recording card 86; a backlight 87, and so on.

Figure 3:
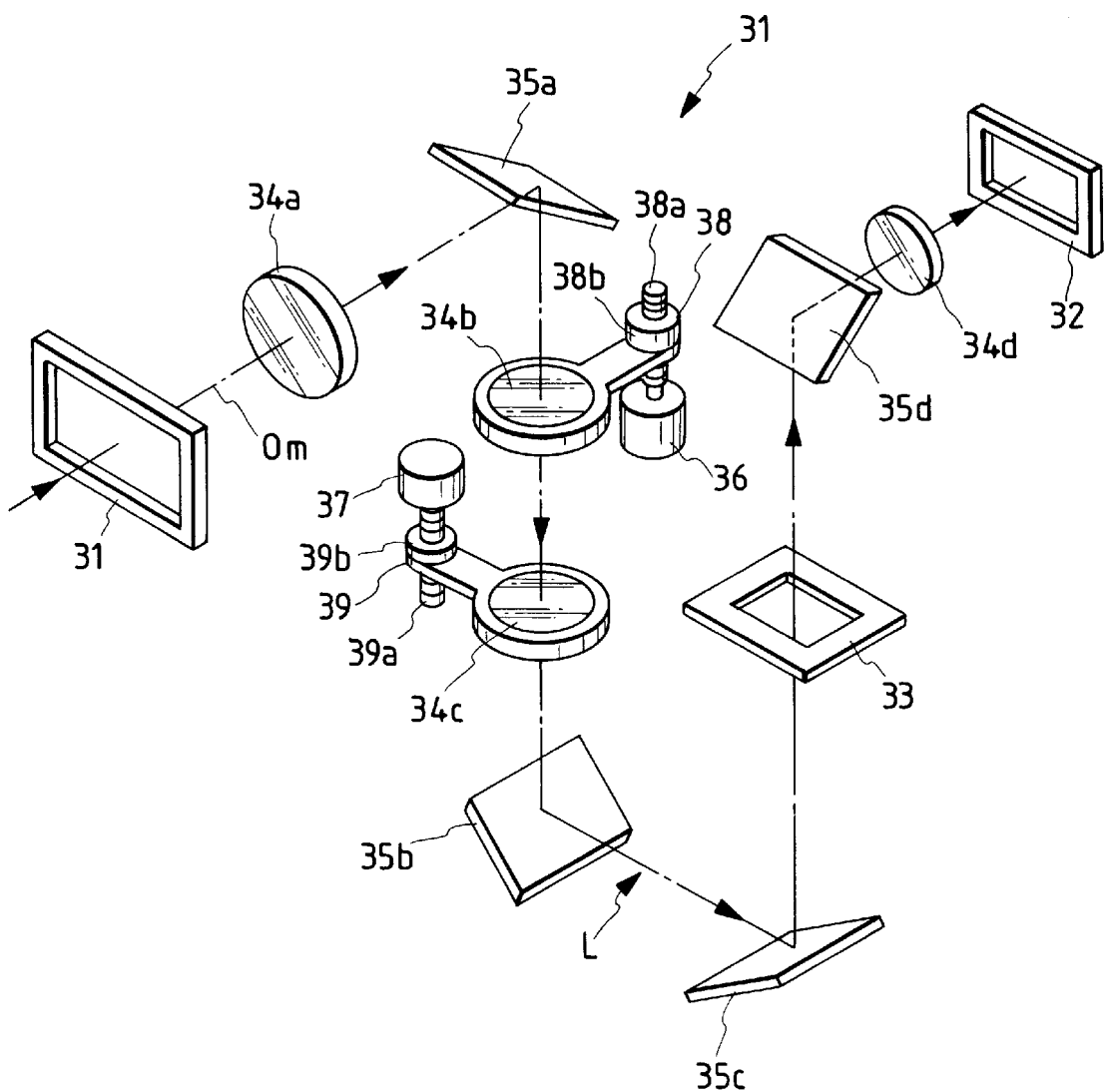
FIG. 3 is a schematic perspective view of the viewfinder optical system of the thin-type camera shown in FIG. 2.
Figure 4A:
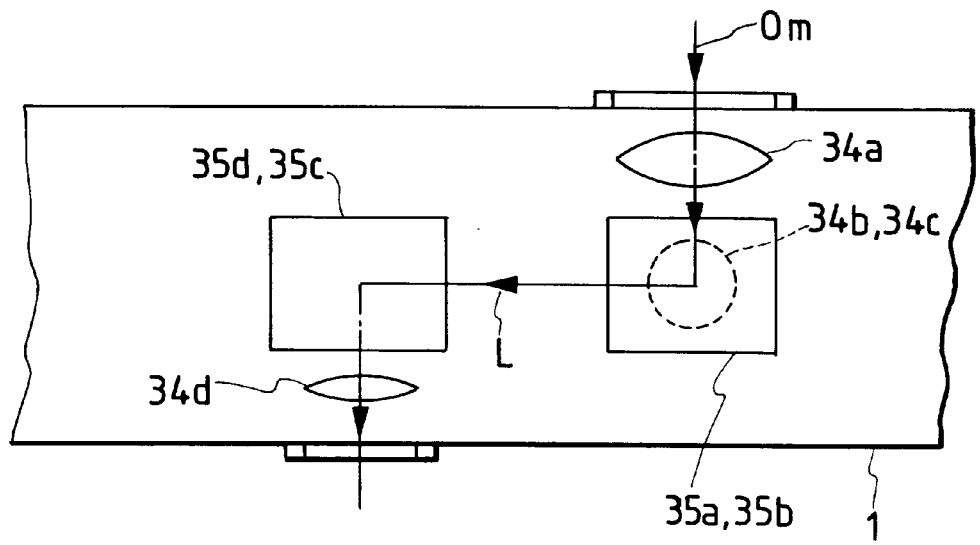
FIGS. 4(a) and 4(b) are a schematic plan view and a schematic side elevational view of the viewfinder optical system.
Figure 4B:
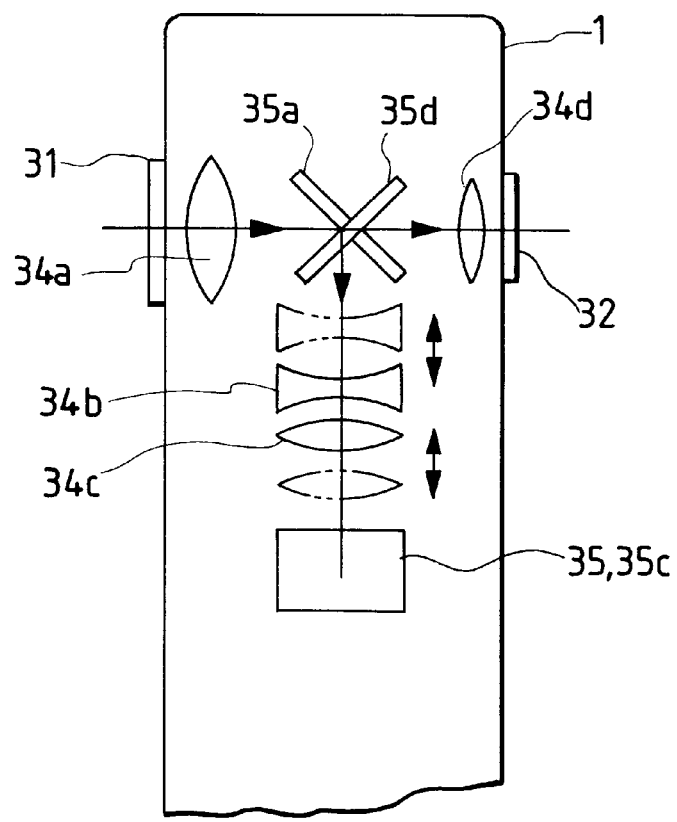

FIG. 3 is a schematic perspective view illustrating the configuration of the viewfinder optical system 3, and FIGS. 4(a) and 4(b) are a schematic plan view and a schematic side elevational view of the viewfinder optical system. The viewfinder optical system 3 is comprised of the first reflecting mirror 35a whose reflecting surface is oriented downward at an angle of 45 degrees with respect to the optical axis of the objective window 31 oriented in parallel with the principal axis of the taking optical system 2, i.e., the principal optical axis Om of the viewfinder optical system; the second reflecting mirror 35b which is disposed at a position immediately below the first reflecting mirror 35a and which is oriented in the rightward direction in the drawing at an angle of 45 degrees; the third reflecting mirror 35c which is disposed at a position located horizontally rightwardly of the second reflecting mirror 35b and whose reflecting surface is oriented upward at an angle of 45 degrees; and the fourth reflecting mirror 35d which is disposed immediately above the third reflecting mirror 35c and at a position opposing ocular window 32 and whose reflecting surface is oriented backward at an angle of 45 degrees. Consequently, the principal optical axis Om is reflected by the first reflecting mirror 35a to be bent diagonally downward, is reflected by the second reflecting mirror 35b to be bent horizontally rightward, is reflected by the third reflecting mirror 35c to be bent vertically upward, is further reflected by the fourth reflecting mirror 35d to be directed in a direction parallel with the principal optical axis Om. As a result, an optical path which is U-shaped as viewed from the front side of the digital camera is formed.

In addition, disposed on the aforementioned optical path L are the first lens 34a secured between the objective window 31 and the first reflecting mirror 35a; the second lens 34b and the third lens 34c which are disposed between the first reflecting mirror 35a and the second reflecting mirror 35b and are respectively movable in the direction of the optical axis; and the fourth lens (eyepiece lens) 34d which is disposed between the fourth reflecting mirror 35d and the ocular window 32 and is movable by a very small amount. Further, the field-of-view mask 33 is disposed between the third reflecting mirror 35c and the fourth reflecting mirror 35d. The second lens 34b and the third lens 34c are arranged to be moved in cooperation with each other in the direction of the optical axis with feeding mechanisms 38 and 39 using miniature motors 36 and 37, respectively. As shown in the drawing, the feeding mechanisms are comprised of screws 38a and 39a which are formed integrally on rotating shafts of the miniature motors 36 and 37, as well as nuts 38b and 39b which are formed integrally with the respective lenses 34b and 34c and are threadedly engaged on the screws 38a and 39b. The arrangement adopted is such that when the screws 38a and 39a are rotated by the rotative driving of the miniature motors 36 and 37, the nuts 38b and 39b whose rotation is stopped advance threadedly on the screws 38a and 39a to move the positions of the lenses 34b and 34c in the direction of the optical axis. It should be noted that the rotation of the miniature motors 36 and 37 is controlled by the drive circuit mounted on the aforementioned circuit board 83 so as to be driven with predetermined relationships with the miniature motors 23 and 24 of the taking optical system 2.

In accordance with the viewfinder optical system of this configuration, a real image of the subject is formed at the position of the field-of-view mask 33 with the first lens 34a, the second lens 34b, and the third lens 34c. At this time, since the image is reflected by the first to third reflecting mirrors 35a to 35c, the image is formed as a real image of an erect reverse image at the position of the field-of-view mask 33. Then, the range of the field of view of the real image is restricted by this field-of-view mask 33, and this real image is reflected by the reflecting mirror 35d, and is then observed by the naked eye of the photographer through the fourth lens 34d. At this time, the image is observed in the state of an erect non-reverse image due to the image formation by the fourth reflecting mirror 35d and the fourth lens 34d. Further, diopter adjustment becomes possible by adjusting the position of the optical axis of the fourth lens 34d with an unillustrated diopter adjustment mechanism.

In addition, in this viewfinder optical system, as the positions of the optical axis of the second lens 34b and the third lens 34c are changed and controlled while being maintained at a predetermined relationship by controlling the respective rotation of the miniature motors 36 and 37, the size of the real image formed at the position of the field-of-view mask 33 is changed, and the size of the image observed through the fourth lens 34d, i.e., the magnification of the viewfinder, to changed. That is, as the positions of the optical axis of the second lens 34b and the third lens 34c are changed as shown by the chain line in FIG. 4(b), the size of the real image is changed, and the magnification of the viewfinder is changed. It should be noted that since this magnification of the viewfinder is linked to the zoom magnification in the taking optical system 2, it is possible to confirm the subject at a magnification corresponding to the image magnification.

Thus, with the viewfinder optical system in this embodiment, since the optical path is made to detour by bending the optical axis by 90 degrees each by the first to fourth reflecting mirrors 35a to 35d, it is possible to secure a long optical path L relative to the depth D of the camera body 1. For this reason, the magnification of the viewfinder can be increased with the increase in the optical path length, and it is possible to arrange a viewfinder having a zooming configuration as in this embodiment. Thus, it is possible to obtain a digital camera having a viewfinder of a high magnification. In addition, since some of the various components which are fitted inside the camera body 1, i.e., the miniature motor 36 and the like in this embodiment, are disposed in the region surrounded by the optical path L of the viewfinder optical system 2, the arrangement is advantageous in making effective use of the inner space of the camera body and reducing the height and width of the camera.

Figure 5:
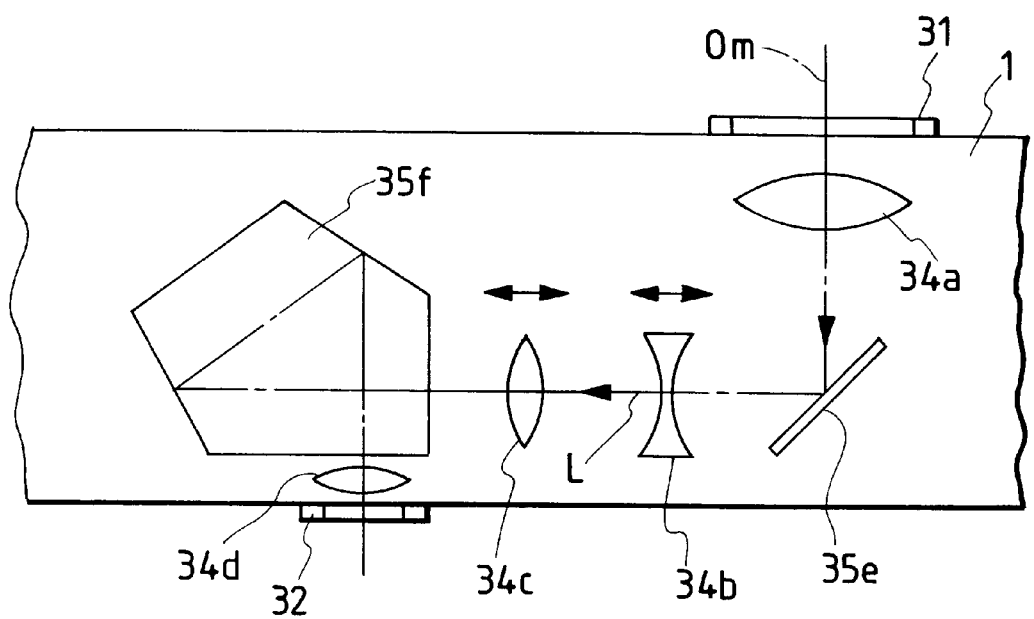
FIG. 5 is a schematic plan view of the viewfinder optical system in accordance with a second embodiment.

FIG. 5 is a schematic plan view illustrating the viewfinder optical system in accordance with a second embodiment, and portions which are equivalent to those of the viewfinder optical system in accordance with the above-described first embodiment are denoted by the same reference numerals. In the above-described embodiment, the optical path length of the viewfinder is increased by making use of the first to fourth reflecting mirrors, but a roof prism is used in this embodiment. The arrangement provided in this embodiment is such that the first lens 34a is disposed on the principal optical axis Om, the light transmitted through this first lens 34a is bent 90 degrees in the horizontal direction, i.e., in the widthwise direction of the camera, by a fifth reflecting mirror 35e, and the second and third lenses 34b and 34c are movable on the bent optical axis. In addition, the optical Axis of the light which passed through these second and third lenses 34b and 34c is bent 270 degrees in the horizontal direction by a roof prism or pentaprism 35f so as to be oriented in a direction parallel with the principal optical axis Om, and the image is formed as a real image of an erect non-reverse image. Then, this real image is viewed and confirmed in enlarged form by the fourth lens 34d. Incidentally, as the arrangement for moving the second and third lenses 34b and 34c in the direction of the optical axis, it is possible to adopt the arrangement in which miniature motors are used in the same way as in the above-described first embodiment. Alternatively, it is possible to adopt an arrangement in which these lenses are moved by a cam mechanism using a cam plate which is linearly moved in the widthwise direction of the camera body by a single miniature motor, although the arrangement is not illustrated. The configuration of the structure of this cam mechanism is already known, and a detailed description thereof will be omitted.

With the viewfinder optical system in accordance with this second embodiment, since the optical path length can be increased by a plurality of reflections inside the roof prism or pentaprism 35f, and the reflection of light for obtaining an erect non-reverse image can be realized, the number of reflecting mirrors can be reduced in comparison with the above-described first embodiment, and the arrangement is effective in reducing the space occupied by the viewfinder optical system. However, to secure an optical path length similar to that in the above-described first embodiment, it is necessary to take a longer widthwise dimension of the camera than in the first embodiment.

Here, although in the above-described embodiments an example is shown in which the first to fourth lenses are formed by single lenses, it goes without saying that the first to fourth lenses may actually be formed by lens groups formed by a plurality of lenses, or as cemented lenses. In addition, it is possible to adopt an arrangement in which the vertical direction in the above-described embodiments is rotated 90 degrees in the vertical direction so as to be set in the horizontal direction. Furthermore, although an example of the viewfinder optical system having a zooming configuration is illustrated in the above-described embodiment, the novel structure described above is also applicable to a viewfinder optical system of a fixed magnification without adopting the zooming structure, and in that case it is possible to configure a viewfinder optical system of a high magnification relative to the depth of the camera.

What is claimed is:

1. In a thin camera which is provided with a taking optical system for photographing a subject, and a viewfinder optical system for confirming a photographing range of the subject, and in which principal optical axes of said taking optical system and said viewfinder optical system are oriented spaced and in parallel with each other, and the depth of said camera along the principal optical axis is formed to be small, said viewfinder optical system comprising:

a first reflecting mechanism which bends said principal optical axis of said viewfinder optical system in a widthwise direction and a heightwise direction of said camera, all of the bending taking place in a plane perpendicular to the principal optical axis of the viewfinder optical system;

a second reflecting mechanism which bends the bent optical axis in a direction parallel with the principal optical axis; and at least one movable lens or lens group arranged on the optical axis bent in the widthwise direction or the heightwise direction of said camera, wherein said first reflecting mechanism includes:

a first reflecting mirror for bending the principal optical axis 90 degrees in the heightwise direction of said camera;

a second reflecting mirror for bending the optical axis, bent by said first reflecting mirror, 90 degrees in the widthwise direction of said camera; and a third reflecting mirror for bending the optical axis, bent by said second reflecting mirror, 90 degrees in an opposite direction to the heightwise direction of said camera, wherein said second reflecting mechanism includes:

a fourth reflecting mirror for bending the optical axis, bent by said third reflecting mirror, 90 degrees in the direction parallel with the principal optical axis, and wherein said at least one movable lens or lens group is arranged between said first reflecting mirror and said second reflecting mirror.

2. The viewfinder optical system according to claim 1, wherein said at least one lens or lens group is made movable in the direction of the bent optical axis between said first and said second reflecting mirrors, and is arranged as a zooming optical system.

3. The viewfinder optical system according to claim 1, wherein said first and second reflecting mechanisms cooperatively define a region surrounded by an optical path of said viewfinder optical system, and a component installed inside said camera is at least partially disposed in said region.

4. The viewfinder optical system according to claim 3, wherein said component is a motor.

5. The viewfinder optical system according to claim 1,
wherein said at least one lens or lens group includes a pair of first and second lenses movable in a direction of the optical axis extending between said first and second reflecting mirrors, and
said viewfinder optical system further comprises:
first and second nuts fixed with respect to said first and second lenses, respectively;
first and second miniature motors having first and second rotating shafts, respectively; and
first and second screws formed on said first and second rotating shafts and threadingly engaged with said first and second nuts, respectively.

6. The viewfinder optical system according to claim 1, wherein said thin camera is a digital thin camera.

7. In a thin camera which is provided with a taking optical system for photographing a subject, and a viewfinder optical system for confirming a photographing range of the subject, and in which principal optical axes of said taking optical system and said viewfinder optical system are oriented spaced and in parallel with each other, and the depth of said camera along the principal optical axis is formed to be small, said viewfinder optical system comprising:

a first reflecting mechanism which bends said principal optical axis of said viewfinder optical system, all of the bending taking place in a plane perpendicular to the principal optical axis of the viewfinder optical system;

a second reflecting mechanism which bends the bent optical axis in a direction parallel with the principal optical axis; and at least one movable lens or lens group arranged on the optical axis bent in a widthwise direction of said camera on said plane, wherein said first reflecting mechanism includes:
a reflecting mirror for bending the principal optical axis 90 degrees in the widthwise direction of said camera with respect to the principal optical axis, wherein said second reflecting mechanism includes:
a prism, and
wherein said at least one movable lens or lens group is arranged between said reflecting mirror and said prism.

8. The viewfinder optical system according to claim 7, wherein said at least one lens or lens group is made movable in the direction of the bent optical axis between said first and said second reflecting mechanism, and is arranged as a zooming optical system.

9. The viewfinder optical system according to claim 7, wherein said thin camera is a digital thin camera.

* * * * *